United States Patent [19]

Link et al.

[11] Patent Number: 5,076,891
[45] Date of Patent: Dec. 31, 1991

[54] HEATED ROLLER AND METHOD FOR ITS OPERATION

[75] Inventors: Christoph Link, Weingarten; Wolf-Gunter Stotz, Ravensburg; Eugen Schnyder, Waltenschwil, all of Fed. Rep. of Germany

[73] Assignee: Sulzer-Escher Wyss GmbH, Ravensburg, Fed. Rep. of Germany

[21] Appl. No.: 543,724

[22] Filed: Aug. 15, 1990

[30] Foreign Application Priority Data

Dec. 21, 1988 [CH] Switzerland ............... 4725/88

[51] Int. Cl.⁵ .................. D21G 1/02; F28F 5/02
[52] U.S. Cl. .................. 162/206; 29/116.2; 100/38; 100/43 RP; 162/290; 162/359; 165/90
[58] Field of Search ............ 162/206, 359, 290; 165/89, 90; 29/116.2; 100/93 RP, 38; 219/10.61 A, 10.492, 469, 471

[56] References Cited

U.S. PATENT DOCUMENTS

| | | | |
|---|---|---|---|
| 4,016,030 | 4/1977 | Sobata | 100/93 RP |
| 4,282,638 | 8/1981 | Christ et al. | 29/116.2 |
| 4,282,639 | 8/1981 | Christ et al. | 29/116.2 |
| 4,498,383 | 2/1985 | Pav et al. | 100/93 RP |
| 4,675,487 | 6/1987 | Verkasalo | 219/10.43 |
| 4,679,287 | 7/1987 | Allard | 29/116.2 |
| 4,729,153 | 3/1988 | Pav et al. | 29/116.2 |
| 4,775,773 | 10/1988 | Verkasalo | 219/10.61 R |
| 4,964,202 | 10/1990 | Pav et al. | 29/116.2 |
| 4,976,820 | 11/1990 | Laapotti | 162/359 |

FOREIGN PATENT DOCUMENTS

| | | | |
|---|---|---|---|
| 0201783 | 11/1986 | European Pat. Off. | |
| 277905 | 8/1988 | European Pat. Off. | 162/359 |
| 3429695 | 2/1986 | Fed. Rep. of Germany | |
| 3525950 | 12/1986 | Fed. Rep. of Germany | |
| 577598 | 7/1986 | Switzerland | |
| WO85/01532 | 4/1985 | World Int. Prop. O. | |

Primary Examiner—Karen M. Hastings
Attorney, Agent, or Firm—Sandler, Greenblum & Bernstein

[57] ABSTRACT

The present invention is directed to a heated sag-compensation roller, with short heat-up and cool-down times and a more even temperature distribution, which reduces the risk of damage to the roller shell. These improvement are achieved by the roller shell being heated or cooled from the inside and the outside simultaneously. The heating devices can be controlled so that the temperature difference between the inside and outside does not exceed a particular value.

15 Claims, 1 Drawing Sheet

HEATED ROLLER AND METHOD FOR ITS OPERATION

BACKGROUND OF THE INVENTION

The invention relates to a process for the operation of a roller with a roller shell which is rotatable on a support fixed against rotation and is braced on this support by at least one bracing element, and having at least one device for affecting the temperature of the roller shell, whereby at least one apparatus for controlling the temperature of the interior of the roller shell, and at least one apparatus for controlling the temperature of the outer surface of the roller shell are respectively provided.

Rollers of this type are known from PCT Application No. WO 85/01532 or German Patent No. 3,429,695 and are preferably used for the treatment of the surfaces of continuous materials under simultaneous pressure and temperature action, in particular fibrous materials, for example, paper, cardboard, non-wovens, textiles or plastics. A particularly suitable use is the smoothing of paper webs in glazing rollers or calenders, where the paper fibers are more easily deformable because of the raised temperature and where a smoothing and glazing effect on the surface of the paper can be attained under the effects of pressure.

It is disadvantageous in these known rollers that in many cases the heating time required for heating the roller to the required operational temperature at startup of the glazing rollers or calender is too long and sometimes requires several hours. Furthermore, irregularities appear in the startup or heating phases which may lead to bursting of the roller shell and could not be overcome up to now.

It is furthermore disadvantageous that the treatment temperature on the exterior surface of the roller attainable with these rollers is limited, because the components required in the interior of the roller and the heating oil are only usable up to a set temperature limit. Furthermore, energy losses in rollers of this type are considerable.

Instead of heating the roller from inside, it was proposed in PCT Application No. WO-85/01532, for example, to provide an exterior heater acting on the outer surface. In this connection irregularities also occur which may lead to the destruction of the roller shell during heating. Here, rollers with hard rubber shells, which are customarily used in glazing rollers and calenders and where the outer skin already is in a certain stress state, have proven to be particularly sensitive. Because exterior heating is applied as a rule shortly ahead of the press gap, temperature variations occur across the periphery of the roller shell during heating at low rpm as well as during operation with higher rpm, which lead to disadvantageous stress because of temperature changes and also result in considerable energy losses.

Deflection compensation rollers, where the rotating roller shell is braced on the support by at least one bracing element, for example with at least one pressure chamber or a plurality of hydraulic or other bracing elements, have proven to be particularly suitable for attaining even pressure, or pressure acting in accordance with a desired profile, and even heat transfer, or heat transfer acting in accordance with a desired profile, from the surface of the roller to the continuous material.

This is of particular advantage with large roller widths up into the range of 10 m, as are customary with paper machines.

Various heatable deflection compensation rollers of the previously mentioned type are known, for example, from U.S. Pat. No. 4,282,638. Lateral nozzles are provided on the support here, from which a hot temperature-transfer medium is sprayed on the interior of the roller shell and the roller shell is heated by means of impact flow heating.

On the other hand, deflection compensation rollers with a plurality of hydrostatic support elements are known from Swiss Patent No. 577,598 or U.S. Pat. No. 4,282,639, the support surfaces of which have bearing pockets, which are supplied with a heated hydraulic medium via a pressure chamber with bores in the support. The interior of the roller shell is heated here to a set temperature by the hot hydraulic medium.

Analogous disadvantages occur when the glazing rollers are stopped and the rollers must be cooled, for example for replacement or finishing work. Considerable time is required for this, too, and there is the danger of damaging or destroying the roller shell when using a cooling agent from the interior or the exterior.

SUMMARY OF THE INVENTION

It is the object of the invention to eliminate the above mentioned disadvantages of the state of the art such as that of German Patent No. 3,429,695 and to provide in particular a roller of the previously mentioned type as well as a method for operating this roller, where the temperature is substantially raised over the permissible interior temperature, where the heating and cooling times are reduced, where the danger of damaging or destroying the roller shell during heating, in the course of operation and during cool-down is reduced, where a higher treatment temperature of the continuous material can be attained and where the energy losses are reduced.

This object is attained in accordance with the invention in that at least one device for affecting the temperature of the interior of the roller shell and at least one device for affecting the temperature of the exterior of the roller shell is provided.

In accordance with the invention the roller is operated in such a way that the devices for affecting the temperature are controlled such that the temperature of the interior of the roller shell differs by no more than a preselected temperature difference from the temperature of the exterior of the roller shell.

Sensors may be provided for regulating both the temperature of the interior and the exterior, which trigger the respective devices for affecting the temperature. The permissible temperature differences between the interior and the exterior of the roller shell may be set differently during the heating, and additionally during the operating and cool-down phases, however a temperature difference of 50° C. during heating and cool-down, and of 80° C. during operation should not be exceeded.

In an improvement of the method the control device can be equipped in such a way that the glazing rollers automatically change into the cooling phase if there is a sudden temperature change on the exterior, for example caused by a break of the continuous material, or of the interior, for example because of a defect in the heating medium supply.

BRIEF DESCRIPTION OF THE DRAWINGS

The invention will be described in detail by means of the attached drawings and further advantages will be disclosed, wherein.

DETAILED DESCRIPTION OF THE PREFERRED EMBODIMENTS

Figure 1:
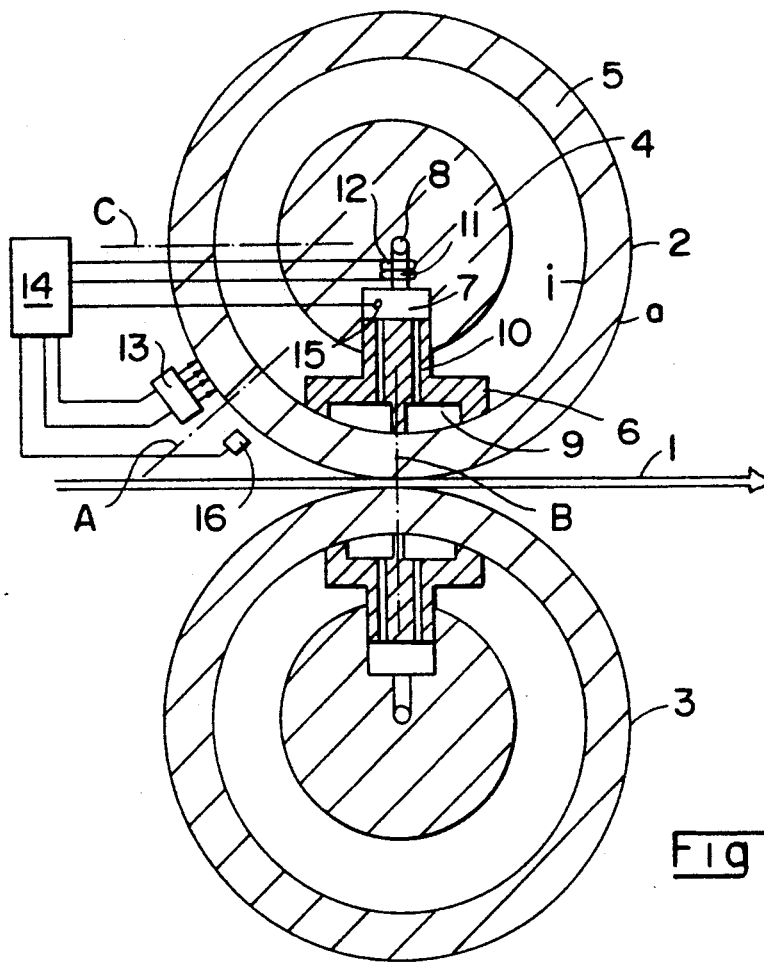
FIG. 1 is a cross section of a roller device with a roller in accordance with the invention.

In the roller device shown in FIG. 1, for example a glazing roller for a paper web, the deflection compensation roller 2, together with a counter roller 3, exerts a pressing force on the continuous material 1 moving between the two rollers.

The deflection compensation roller 2 may be embodied, for example, in accordance with U.S. Pat. No. 3,802,044 and has a support 4 fixed against rotation and a roller shell 5 rotatable around it, which is braced by a plurality of hydrostatic bracing elements 6, disposed axially next to each other, against the support. These bracing elements have a piston/cylinder guidance with a pressure chamber 7 which is supplied with a hydraulic pressure medium via a support bore 8. Bearing pockets 9, which are supplied with pressure medium from the pressure chamber 7 by means of throttling ports 10 and which provide hydrostatic seating of the roller shell 2 on the bracing elements 6, are located on the support surface of the bracing elements 6.

The supply line 11 from the support bore 8 to the pressure chamber 7 can be heated by means of a heating device 12, for example an electrically operated heater coil, and provides heating of the hydraulic pressure medium, which reaches the bearing pockets 9 via the pressure chamber 7 and the throttling ports 10 and heats the interior i of the roller shell at the place of the plane B. On the other hand, a heating device 13 is provided outside of the roller 2, which also heats the exterior a of the roller shell 5, for example by means of radiant heat. By means of this, the roller shell 5 is heated from the interior as well as the exterior and is brought to the temperature required for treating the paper web and is maintained at an operating temperature.

It should be noted that it is also possible to use, in place of the described deflection compensation roller with hydrostatic bracing element, other types of deflection compensation rollers, for example rollers which are hydrodynamically or magnetically braced or other known types of rollers with controllable deflection. In this connection it is possible to provide a plurality of bracing elements placed side-by-side, which can be heated separately and individually by means of associated heating devices, where the exterior of the roller shell can also be heated by exterior heaters associated with the individual bracing elements. Alternatively, a single bracing element extending in the axial direction may be provided. Instead of providing interior heating via the bracing elements, it is also possible to heat the interior of the roller shell by means of entirely separate heating devices, for example by means of impact flow heating as is known for example from U.S. Pat. No. 4,282,638, or in any other suitable manner.

The counter roller 3 may be designed as a conventional roller or may also be a deflection compensation roller without heating devices.

It is advantageous to provide a control or regulating device 14 for operating the roller device and in particular the heating devices 12 and 13 for the interior i and the exterior a of the roller shell 5, which control the heat output of the heating device 12 and the heating device 13. Control of the heat output is performed in such a way, that the temperature difference T between the interior i and the exterior a of the roller shell 5 does not exceed certain predetermined values, for example 50° C. As a rule, heating of the interior and heating of the exterior are performed simultaneously, where at the start of the heating process it is possible to provide a predetermined earlier start for heating the interior, by means of which the time delay caused by heating the bracing elements 6 versus the immediately effective exterior heating 13 can be compensated.

Temporal control of the heat output in this case may be either by means of a fixed control program or may be performed in a closed control loop, where sensors 15 for measuring the actual value of the temperature of the hydraulic pressure medium in the pressure chamber 7 or at another suitable location as well as sensors 16 for contactless temperature measurement on the exterior surface a of the roller shell 5 are provided. In accordance with the output signal of the sensors 15 and 16, the heat output of the heating devices 12 and 13 is controlled in such a way that the predetermined temperature differences between the interior i and the exterior a are not exceeded.

It was possible to prevent the previously described disadvantages of the state of the art, in particular damage to the roller shell, in an exemplary embodiment of the roller 2 in accordance with the invention, which can be heated from the interior as well as the exterior, having a hard rubber shell, a diameter of approximately 100 mm and a length of 9 m, if the control device was set in such a way, that the temperature difference T between the interior and the exterior was no greater than 50° C. during the heating-up process.

Figure 2:
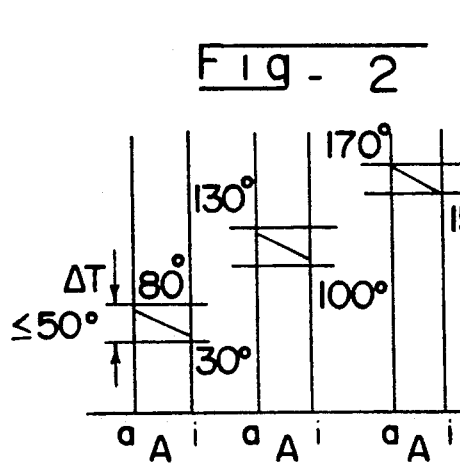
FIG. 2 illustrates temperature diagrams of the roller shell during heating.
Figure 3:
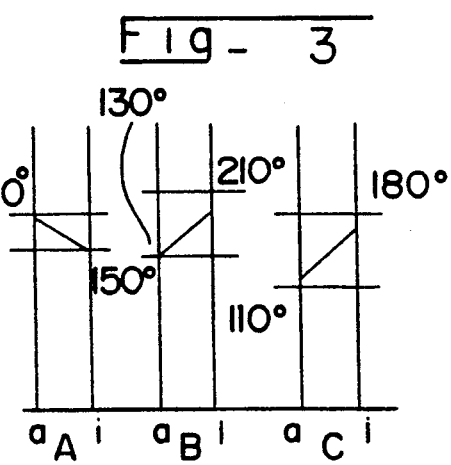
FIG. 3 illustrates temperature diagrams of the roller during operation.

FIG. 2 illustrates a typical example of the course of the temperature T in the roller shell 5 from the exterior a to the interior i at three different points in time of the heating-up process, during which the roller rotates at a reduced speed, namely in the sectional plane A shortly after the effect of the outer heating element 13, but before the bracing element 6, by means of which interior heating is performed. At the first point in time, shortly after the two heating devices 12 and 13 have been switched on, preferably the exterior heating acts first, while the interior heating is activated with a time delay. During this first phase the exterior heater 13 is slowed in such a way that the exterior temperature of the roller shell 5 is no more than 50° C. higher than the interior temperature. After a certain time the interior temperature has risen faster than the exterior temperature, so that the temperature difference is only 30° C., and at the end of the heating-up phase an end temperature of 170° C. is attained on the exterior, while the interior temperature is around 150° C. This state could be obtained already after approximately 1 hour with the described embodiment.

After placing the paper web 1 between the rollers 2 and 3 and the start of normal operation at increased rpm corresponding to a web speed of 1,400 m/min, the exterior a of the roller shell 5 is cooled by heat removal to 130° C. at the pressing point, i.e. in the sectional plane B, while at the same time the interior is heated by the bracing element 6 to a temperature which is no more than 80° C. higher than the exterior temperature, for example 210° C. In the course of the rotation of the roller 2 the temperatures on the interior surface of the roller shell i and the exterior a continuously decrease until shortly before the exterior heating device 13 in the sectional plane C they have been cooled to 110° C. on the exterior and to 180° C. in the interior. After heating-up from the exterior in the sectional plane A, 170° C. on the exterior a and 150° C. in the interior i have again been reached.

The mechanical stresses generated in the roller shell by the temperature differences between the interior and the exterior occurring with this method and the temperature variations in the course of operation have been clearly reduced in comparison with previously known rollers, where heating from the exterior or from the interior only had been provided, so that the breaking limit was nowhere attained and damage of the roller shell was avoided.

It is particularly advantageous to provide a plurality of parallel bracing elements 6 next to each other in the axial direction of the roller 2, which are heated individually and independently of each other and which can be controlled by the control or regulating device 14. A corresponding number of exterior heating elements 13, assigned to the bracing elements 6, can also be individually controlled by the control or regulating device 14. In this way it is possible to set the temperature difference between the interior and exterior to a different value at the roller ends outside of the paper web, where there is no cooling by the running paper web, than that in the area of the paper web, so that deflection of the roller shell at the ends in the form of a bending of the shaft or in the form of an "oxbow" effect can be avoided.

It is to be noted that the object of the invention can also be employed in an analogous manner during the cool-down phase at the end of the roller operation, where the heating devices 12 and 13 are replaced by appropriate cooling devices. In this cool-down phase, operation also takes place in such a way that the control or regulating device 14 controls the cooling devices 12 and 13 so that in the course of this cool-down phase the temperature differences between the interior i and the exterior a of the roller shell 5 do not exceed predetermined values, so that unacceptable and damaging mechanical stresses in the roller shell are avoided. In this case the cool-down time can be drastically reduced in comparison to the customary slow cooling, so that expensive idle time of the roller device is considerably reduced.

In an advantageous improvement of the invention it is possible to design the regulating device 14 in such a way that if impermissible temperature differences beyond a set value are detected by the temperature sensors 15 and 16, for example because of a break of the web, operation is automatically stopped and the device is switched into the cool-down phase. Operational safety is considerably increased by this.

We claim:

1. A method for operating a roller device having a roller shell, said roller shell being rotatable on a support, said support being fixed against rotation, said roller shell being braced on said support by at least one bracing element, at least one first device for affecting the temperature of the interior of said roller shell, and at least one second device for affecting the temperature of the exterior of said roller shell, said method comprising controlling the temperature difference between the exterior and interior of the roller shell, so that said temperature difference does not exceed a predetermined value.

2. The method according to claim 1, wherein said temperature difference does not exceed 50° C. during a heating phase and a cool-down phase.

3. The method according to claim 1, comprising the step of pressing continuous material by said roller device, wherein said temperature difference does not exceed 80° C. during the step of pressing.

4. The method according to claim 1, comprising providing at least one sensor for sensing the temperature of the interior and exterior of said roller shell, and providing a regulating device to control said first and second devices to thereby control said temperature difference.

5. The method according to claim 1, comprising switching said roller device to a cool-down phase when said temperature difference between the interior and exterior of said roller shell exceeds said predetermined value.

6. The method according to claim 1, wherein said at least one bracing element comprises at least one hydrostatic bracing element supplied with a pressure medium, wherein said first device for affecting the temperature of said roller shell changes the temperature of said pressure medium.

7. The method according to claim 6, comprising supplying said pressure medium to a bearing pocket of said at least one hydrostatic bracing element.

8. A roller device comprising:
   (a) a roller shell having an interior and exterior;
   (b) a support being fixed against rotation, said roller shell being rotatable on said support;
   (c) a first device for affecting the temperature of the interior of said roller shell;
   (d) a second device for affecting the temperature of the exterior of said roller shell; and
   (e) control means for controlling the temperature difference between the exterior and interior of said roller shell, structured and arranged so that said temperature difference does not exceed a predetermined value.

9. The roller device according to claim 8, wherein said roller device is structured and arranged to include a heating phase and a cool-down phase, and said control means is structured and arranged so that said temperature difference does not exceed 50° C. during said heating phase and said cool-down phase.

10. The roller device according to claim 8, wherein said roller device is structured and arranged to press continuous material, and said control means is structured and arranged so that said temperature difference does not exceed 80° C. during the pressing of the continuous material.

11. The roller device according to claim 8, wherein said control means comprises at least one sensor for sensing the temperature of the interior and exterior of said roller shell, and a regulatory device to control said first device and said second device in response to the temperature sensed by said at least one sensor to thereby control said temperature difference.

12. The roller device according to claim 8, further comprising a cooling device, and wherein said roller device is structured and arranged to include a cool-down phase, said cooling device being structured and arranged to operate in said cool-down phase when said temperature difference exceeds said predetermined value.

13. The roller device according to claim 8, wherein said roller shell is braced on said support by at least one bracing element.

14. The roller device according to claim 13, wherein said at least one bracing element comprises a hydrostatic bracing element, said hydrostatic bracing element being supplied with a pressure medium, said first device changing the temperature of said pressure medium.

15. The roller device according to claim 14, said hydrostatic bracing element including a bearing pocket, and said pressure medium being supplied to said bearing pocket.

* * * * *